H. LAVE.
TWO-WHEEL DRIVE.
APPLICATION FILED JUNE 3, 1918.

1,349,212.

Patented Aug. 10, 1920.

WITNESSES.
C. L. Haal
H. D. Chase

INVENTOR.
Henry Lave
By R. S. C. Caldwell
ATTORNEY.

UNITED STATES PATENT OFFICE.

HENRY LAVE, OF MILWAUKEE, WISCONSIN.

TWO-WHEEL DRIVE.

1,349,212.  Specification of Letters Patent.  Patented Aug. 10, 1920.

Application filed June 3, 1918. Serial No. 238,026.

*To all whom it may concern:*

Be it known that I, HENRY LAVE, a citizen of the United States, and resident of Milwaukee, in the county of Milwaukee and State of Wisconsin, have invented new and useful Improvements in Two-Wheel Drives, of which the following is a description, reference being had to the accompanying drawings, which are a part of this specification.

This invention relates to driving mechanism for automobiles and has for its object to take the place of the usual differential gear drive for the rear wheels of an automobile truck or the like.

Another object of the invention is to accomplish the reverse drive of the wheels and dispense with the necessity for reverse drive gears in the speed change gear box.

Another object of the invention is to provide a direct drive for the slower moving wheel while permitting of differential action or acceleration of the faster moving wheel by a ratchet connection on turning corners.

Another object of the invention is to simplify the construction of a two wheel gear drive of this type.

With the above and other objects in view the invention consists in the two wheel drive as herein claimed and all equivalents.

Figure 1:
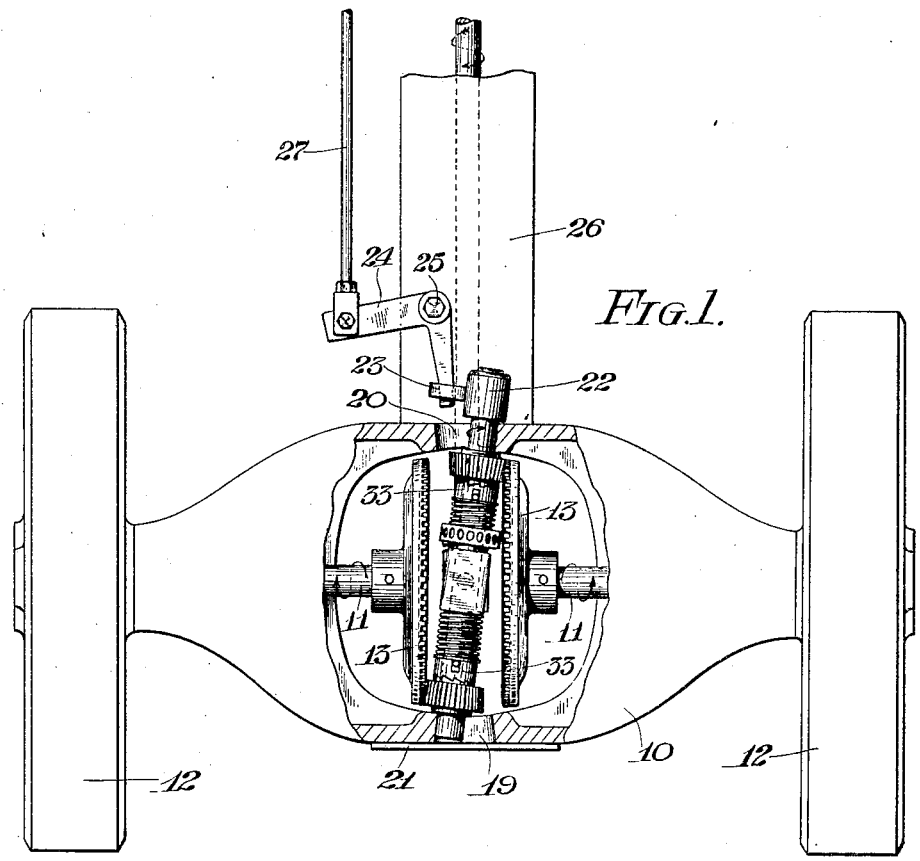
Figure 2:
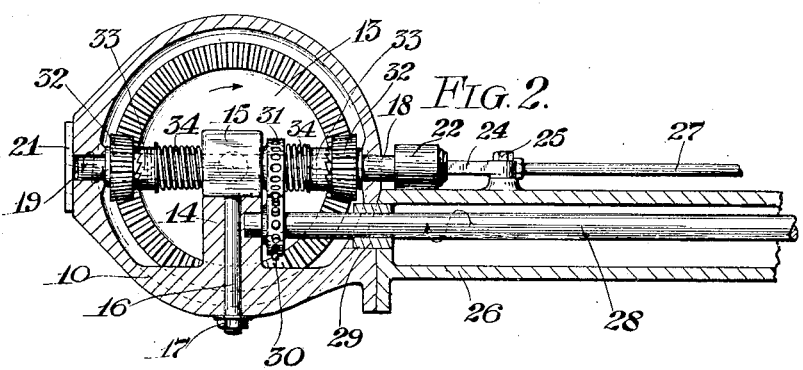

Referring to the accompanying drawing, in which like characters of reference indicate the same parts in different views:

Figure 1 is a plan view of the two wheel drive of this invention with the casing broken away; and Fig. 2 is a central sectional view thereof.

In these drawings 10 indicates the gear case in which are journaled the rear driving axles 11 carrying the wheels 12 as usual. Within the gear casing each of the axles 11 has fixed on it a large beveled gear wheel 13, and pivotally mounted on a post 14 upstanding from the bottom of the gear casing between the beveled gear wheels 13 is an oscillating bearing member 15. The pivotal mounting for the bearing member 15 preferably consists of a screw stud 16 projecting downwardly therefrom through an opening in the post 14, with a nut 17 threaded on its lower end.

A swinging shaft 18 is loosely mounted in the bearing member 15 with its ends slidably fitting in slots 19 and 20 through the rear and the front of the gear casing 10 respectively.

A cover plate 21 closes the end of slot 19 and the end of the swinging shaft 18 continues beyond the slot 20 where it is provided with a loose sleeve 22 having an eye 23 projecting from one side to receive one arm of a bell crank 24 pivotally mounted at 25 on a tubular extension 26 of the gear casing 10. A connecting rod 27 connects the other arm of bell crank 24 with a suitable operating lever, not shown, within reach of the driver, and by means thereof the bell crank may be operated to swing the shaft 18 on the pivotal connection of its bearing 15.

A driving shaft 28 driven by the engine in the same direction and preferably at varying speeds controlled by a speed change gear as usual, enters the gear casing by way of the tubular extension 26 and has a bearing 29 at the junction of the gear casing with the tubular extension 26 and also has an end thrust bearing in the pivot post 14. A pinion 30 fixed on the drive shaft and preferably having rounded teeth as shown, meshes with a pinion 31 fixed on the swinging shaft 18 above it. The pinion 31 is preferably of the type having elongated slots or sockets to receive the teeth of pinion 31. This form of driving connection between the drive shaft 28 and the swinging shaft 18 is preferred to permit of the angular positions of the swinging shaft 18 with respect to the driving shaft without binding, though any other form of gear connection suitable for the purpose may be employed.

Beveled pinions 32 are loosely mounted on the swinging shaft 18 and have ratchet toothed clutch connection with clutch members 33 which are splined on the shaft 18 to be capable of longitudinal movement without independent rotary movement. The direction of the ratchet teeth of the clutch members 33 is such as to compel the pinions to turn with the swinging shaft but permitting them to turn faster in the same direction by the slippage of the ratchet teeth. Coil springs 34 surrounding the shaft 18 and bearing on the clutch members 33 urge them away from the bearing 15 into their clutching engagement with the pinions.

In a central or neutral position of the swinging shaft 18 both of the beveled pinions 32 will clear both of the beveled gears 13 and the engine may turn freely without affecting the drive wheels 12. When the swinging shaft 18 is moved by the operation of the bell crank to one extreme position, as shown in Fig. 1, the front pinion 32 is moved into mesh with one of the gear wheels 13 and the rear pinion 32 is moved into mesh with the other gear wheel 13 so that both axles are driven in the same direction and at the same speed for turning the drive wheels 12 in the direction for propelling the vehicle forwardly. By a shifting movement of the swinging shaft 18 to its other extreme position, the pinions 32 will be swung into mesh with the opposite gear wheels to those engaged by them before, thus reversing the direction of drive of the axles 11 to cause the backing of the vehicle, while the driving shaft 28 turns in the same direction.

In either driving position direct driving connection is made with each of the driving wheels 12 so that traction is maintained notwithstanding the slipping of one driving wheel, and when the occasion arises for one driving wheel turning faster than the other, as when the vehicle is turning a corner, such accelerated movement is permitted by the slipping of the ratchet clutches 33 whether the vehicle is being driven forwardly or rearwardly.

By means of this invention the driving gear is made exceedingly simple without the use of planetary differential gears and still permitting of the differential action in the turning of the driving wheels necessary for turning corners, and the reverse in direction of drive is accomplished at all driving speeds, making it unnecessary to provide reversing gears in the speed change box as usual.

I desire it to be understood that this invention is not limited to any specific form or arrangement of parts except in so far as such limitations are specified in the claims.

What I claim as new and desire to secure by Letters Patent is:

1. A two wheel drive for automobiles and the like, comprising a drive shaft, a pinion thereon, a swinging shaft, a pinion mounted on said swinging shaft and meshing with the pinion of the drive shaft, a pair of pinions on the swinging shaft turning therewith and positioned on opposite sides of the fulcrum of the swinging shaft, and drive wheel shafts, each having a gear wheel alternately engaged by the pinions respectively in the extreme positions of the swinging shaft.

2. A two wheel drive for motor vehicles comprising a pair of oppositely positioned independent gear wheels, a drive wheel connected with each gear wheel, a swinging shaft fulcrumed intermediate its ends between said gear wheels, a pair of pinions mounted on the swinging shaft to turn therewith and each meshing with one of the gear wheels in one extreme pivotal position of the swinging shaft and positioned on opposite sides of the fulcrum of the swinging shaft, means for swinging the swinging shaft, a drive shaft, and a gearing connection between said swinging shaft and drive shaft.

3. A two wheel drive for automobiles and the like, comprising a pair of oppositely positioned gear wheels, a drive wheel having connection with each gear wheel, a swinging shaft fulcrumed between the gear wheels, a pair of pinions having ratchet clutch connection with the swinging shaft to turn therewith, each pinion meshing with one of the gear wheels in one extreme pivotal position of the swinging shaft and adapted to be changed to mesh with the other gear wheel in the other extreme pivotal position of the swinging shaft, means for swinging the swinging shaft, and suitable means for driving the swinging shaft.

4. A two wheel drive for automobiles and the like, comprising a pair of independent gear wheels oppositely positioned, a pair of drive wheel shafts, each connected with one of said gear wheels, a swinging shaft fulcrumed between the gear wheels, pinions on the swinging shaft turning therewith and each meshing with one of the gear wheels in one extreme pivotal position of the swinging shaft and adapted to be changed to mesh with the other gear wheel in the other extreme pivotal position of the swinging shaft, a third pinion fixed on the swinging shaft, a drive shaft having a pinion meshing with the third pinion, and means for swinging the swinging shaft.

5. A two wheel drive for automobiles and the like, comprising a pair of gear wheels oppositely disposed, a pair of drive wheel shafts connected with the gear wheels respectively, a swinging shaft fulcrumed between the gear wheels, a pair of pinions on the swinging shaft having ratchet clutch connection therewith and each meshing with one of the gear wheels in one extreme pivotal position of the swinging shaft and adapted to change to mesh with the other gear wheel in the other extreme pivotal position of the swinging shaft, means for swinging the swinging shaft, a third pinion fixed on the swinging shaft, and a suitably driven drive shaft having a pinion meshing with the third pinion.

6. A two wheel drive for automobiles and the like, comprising a casing, axles journaled therein, drive wheels on the axles, gear wheels on the axles within the gear casing, a pivot post within the casing between the gear wheels, an oscillating bearing pivotally mounted on the pivot post, a swinging shaft journaled in the oscillating bearing with its ends traveling through slots of the gear casing, means engaging one end of the swinging shaft for swinging it on the pivotal connection of the oscillating bearing, pinions loosely mounted on the swinging shaft and respectively meshing with the gear wheels, spring-pressed ratchet clutch members splined on the swinging shaft and engaging the pinions, a third pinion fixed on the swinging shaft, and a drive shaft having a pinion meshing with the third pinion.

In testimony whereof, I affix my signature, in presence of two witnesses.

HENRY LAVE.

Witnesses:
R. S. C. CALDWELL,
H. D. CHASE.